United States Patent
Jung et al.

(10) Patent No.: US 11,811,043 B2
(45) Date of Patent: Nov. 7, 2023

(54) ELECTRODE FOR ALL-SOLID-STATE BATTERY AND METHOD FOR MANUFACTURING ELECTRODE ASSEMBLY COMPRISING THE SAME

(71) Applicant: LG Chem, Ltd., Seoul (KR)

(72) Inventors: Hye-Ri Jung, Daejeon (KR); Lak-Young Choi, Daejeon (KR); Hyea-Eun Han, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/271,760

(22) PCT Filed: May 15, 2020

(86) PCT No.: PCT/KR2020/006461
§ 371 (c)(1),
(2) Date: Feb. 26, 2021

(87) PCT Pub. No.: WO2020/231234
PCT Pub. Date: Nov. 19, 2020

(65) Prior Publication Data
US 2021/0328206 A1 Oct. 21, 2021

(30) Foreign Application Priority Data
May 15, 2019 (KR) ........................ 10-2019-0057046

(51) Int. Cl.
*H01M 4/04* (2006.01)
*H01M 4/62* (2006.01)
(Continued)

(52) U.S. Cl.
CPC .......... *H01M 4/0404* (2013.01); *H01M 4/622* (2013.01); *H01M 10/0525* (2013.01);
(Continued)

(58) Field of Classification Search
CPC ................... H01M 2004/021; H01M 10/0562
See application file for complete search history.

(56) References Cited

U.S. PATENT DOCUMENTS

2001/0016290 A1  8/2001  Kezuka
2011/0027661 A1  2/2011  Okazaki et al.
(Continued)

FOREIGN PATENT DOCUMENTS

CN  103579593 A  2/2014
CN  104396065 A  3/2015
(Continued)

OTHER PUBLICATIONS

International Search Report for Application No. PCT/KR2020/006461, dated Sep. 1, 2020, 3 pages.

*Primary Examiner* — Austin Murata
(74) *Attorney, Agent, or Firm* — Lerner David LLP

(57) ABSTRACT

The present disclosure may obtain an electrode for an all-solid-state battery with low porosity by adjusting the concentration of an electrode active material layer-forming slurry and a solid electrolyte layer-forming slurry. The all-solid-state battery uses a solid electrolyte material, not a liquid electrolyte material, and thus it needs to have a close contact between the constituent materials of the battery such as an electrode active material and a solid electrolyte material, and when the manufacturing method according to the present disclosure is applied, the electrode active material layer is filled with the solid electrolyte material, bringing the components into close contact, thereby improving the interfacial resistance characteristics.

10 Claims, 2 Drawing Sheets

(51) Int. Cl.
*H01M 10/0525* (2010.01)
*H01M 10/0562* (2010.01)

(52) U.S. Cl.
CPC .... *H01M 10/0562* (2013.01); *H01M 2220/20* (2013.01); *H01M 2300/0068* (2013.01)

(56) References Cited

U.S. PATENT DOCUMENTS

| | | | |
|---|---|---|---|
| 2013/0040206 A1 | 2/2013 | Yoshida et al. | |
| 2013/0157143 A1* | 6/2013 | Hoshiba | H01M 4/621 |
| | | | 429/211 |
| 2014/0377619 A1 | 12/2014 | Kwon et al. | |
| 2015/0056520 A1* | 2/2015 | Thokchom | H01M 4/0471 |
| | | | 429/246 |
| 2015/0086875 A1 | 3/2015 | Yoshida | |
| 2015/0325838 A1 | 11/2015 | Tamaki et al. | |
| 2017/0092988 A1 | 3/2017 | Haga et al. | |
| 2018/0097255 A1 | 4/2018 | Jung et al. | |
| 2018/0254520 A1 | 9/2018 | Maeda | |
| 2019/0081351 A1* | 3/2019 | Kim | H01M 10/052 |
| 2019/0252719 A1* | 8/2019 | Tomura | H01M 4/134 |
| 2020/0161635 A1* | 5/2020 | Liu | H01M 4/366 |
| 2020/0350628 A1 | 11/2020 | Isojima et al. | |

FOREIGN PATENT DOCUMENTS

| | | | |
|---|---|---|---|
| CN | 107534125 | A | 1/2018 |
| EP | 3595069 | A1 | 1/2020 |
| JP | 2009193940 | A | 8/2009 |
| JP | 201154439 | A | 3/2011 |
| JP | 2011233422 | A | 11/2011 |
| JP | 2012252833 | A | 12/2012 |
| JP | 2015518645 | A | 7/2015 |
| JP | 6296030 | B2 | 3/2018 |
| JP | 2018106844 | A | 7/2018 |
| KR | 100624059 | B1 | 11/2006 |
| KR | 101724817 | B1 | 4/2017 |
| KR | 20180072944 | A | 7/2018 |
| KR | 20180073442 | * | 7/2018 |
| KR | 20180073442 | A | 7/2018 |
| WO | 2011105574 | A1 | 9/2011 |
| WO | 2013146916 | A1 | 10/2013 |
| WO | 2017047379 | A1 | 3/2017 |
| WO | 2018163776 | A1 | 9/2018 |
| WO | 2019151373 | A1 | 8/2019 |

* cited by examiner

ELECTRODE FOR ALL-SOLID-STATE BATTERY AND METHOD FOR MANUFACTURING ELECTRODE ASSEMBLY COMPRISING THE SAME

CROSS-REFERENCE TO RELATED APPLICATION(S)

This application is a national phase entry under 35 U.S.C. § 371 of International Application No. PCT/KR2020/006461 filed May 15, 2020, which claims priority from Korean Patent Application No. 10-2019-0057046 filed May 15, 2019, all of which are incorporated herein by reference.

TECHNICAL FIELD

The present disclosure relates to an electrode for an all-solid-state battery and a method for manufacturing an electrode assembly comprising the same.

BACKGROUND ART

Compared to batteries using liquid electrolytes, all-solid-state batteries using solid electrolyte materials have the enhanced safety, prevent the leakage of the electrolytes, leading to improved reliability of the batteries, and are easy to manufacture thin batteries. Additionally, they have the improved energy density due to the use of lithium metal for the negative electrode, and accordingly, along with small secondary batteries, it is expected that they are used in high capacity secondary battery applications for electric vehicles.

Due to using solid electrolytes instead of liquid electrolytes, all-solid-state batteries contain a large amount of solid electrolyte materials in the electrodes including the positive electrode and the negative electrode to create an environment in which ions move by impregnation of the electrode with the liquid electrolyte as in liquid electrolyte batteries, i.e., to achieve similar ionic conductivity to batteries using liquid electrolytes.

In the case of an all-solid-state battery comprising a sulfide-based solid electrolyte as a solid electrolyte material, the interfacial resistance between positive electrode/solid electrolyte layer/negative electrode greatly affects the cell resistance. In addition to the resistance between each layer, when the contact area between the active material and the electrolyte in each electrode is high, the interfacial resistance between particles is low. In general, an electrode is manufactured using a slurry having high solids content, and a solid electrolyte layer is overcoated on the electrode. The electrode assembly is manufactured by overcoating and roll pressing the electrolyte layer, but still the interfacial resistance is high or roll pressing is not good.

DISCLOSURE

Technical Problem

The present disclosure is designed to solve the above-described technical problem, and therefore the present disclosure is directed to providing an electrode for an all-solid-state battery with reduced interfacial resistance between an electrode and an electrolyte membrane and a method for manufacturing an electrode assembly for an all-solid-state battery. These and other objects and advantages of the present disclosure will be understood by the following description. Additionally, it will be readily appreciated that the objects and advantages of the present disclosure may be realized by means or methods described in the appended claims and a combination thereof.

Technical Solution

The present disclosure is designed to solve the above-described technical problem. A first aspect of the present disclosure relates to a method for manufacturing an electrode for an all-solid-state battery, and the method comprises (S1) a first step of preparing a preliminary electrode active material layer-forming slurry comprising an electrode active material and a solid electrolyte, wherein a concentration of solids except a solvent in the slurry is 30 wt % to 60 wt %, (S2) a second step of coating the preliminary electrode active material layer-forming slurry on a surface of a current collector and drying the preliminary electrode active material layer-forming slurry to form a preliminary electrode active material layer, (S3) a third step of preparing a solid electrolyte layer-forming slurry comprising a solid electrolyte material, wherein a concentration of solids except a solvent in the slurry is 30 wt % to 50 wt %, and (S4) a fourth step of coating the solid electrolyte layer-forming slurry on a surface of the preliminary electrode active material layer and drying the solid electrolyte layer-forming slurry. According to a second aspect of the present disclosure, in the first aspect, the preliminary electrode active material layer obtained in the second step has porosity of 50 vol % to 70 vol %.

According to a third aspect of the present disclosure, in the first or second aspect, the electrode obtained in the fourth step comprises an electrode active material layer and a solid electrolyte layer formed on a surface of the electrode active material layer, and the electrode active material layer has porosity of 20 vol % to 30 vol %.

According to a fourth aspect of the present disclosure, in any one of the first to third aspects, the solid electrolyte material comprises a sulfide-based solid electrolyte material.

According to a fifth aspect of the present disclosure, in the fourth aspect, the sulfide-based solid electrolyte contains sulfur (S) and comprises at least one of Li—P—S(LPS) based glass or Li—P—S(LPS) based glass ceramics.

According to a sixth aspect of the present disclosure, in at least one of the first to fifth aspects, the solvent comprises a nonpolar solvent.

According to a seventh aspect of the present disclosure, in the sixth aspect, the nonpolar solvent comprises at least one of 1,2-dichlorobenzene, pentane, benzene, xylene, toluene, chloroform, hexane, cyclohexane, carbon tetrachloride, ether, diethylamine, ioxane, chlorobenzene, anisole, tetrahydrofuran, methyl t-butyl ether or heptane.

According to an eighth aspect of the present disclosure, in at least one of the first to seventh aspects, the preliminary electrode active material layer-forming slurry and/or the solid electrolyte layer-forming slurry comprises a binder resin, and the binder resin comprises at least one of acrylate, acrylonitrile-styrene-butadiene copolymer, styrene-butadiene copolymer, isobutylene-isoprene copolymer including butyl rubber, acrylonitrile-butadiene-rubber (NBR), butadiene-rubber (BR) or ethylene propylene diene terpolymer (EPDM).

A ninth aspect of the present disclosure relates to a method for manufacturing an all-solid-state battery, comprising stacking a positive electrode and a negative electrode and applying the pressure, wherein at least one of the negative electrode or the positive electrode is defined in any one of the first to eighth aspects, and the positive electrode and the negative electrode are stacked with a solid electrolyte layer interposed between.

A tenth aspect of the present disclosure relates to an all-solid-state battery, and the all-solid-state battery comprises a positive electrode, a negative electrode and a solid electrolyte membrane interposed between the positive electrode and the negative electrode, wherein at least one of the negative electrode or the positive electrode is manufactured by the method according to any one of the first to eighth aspects.

Advantageous Effects

The electrode and/or the electrode assembly manufactured by the manufacturing method of the present disclosure may provide the following effects.

(1) It is possible to reduce the interfacial resistance between the electrode and the solid electrolyte membrane.

(2) It is possible to reduce the interfacial resistance between the electrode active material and the solid electrolyte in the electrode.

(3) It is possible to reduce the porosity in the electrode.

(4) When the electrode and the electrode assembly manufactured by the manufacturing method of the present disclosure are applied to a battery, it is possible to improve the electrochemical properties of the battery such as capacity, rate and cycling performance.

BRIEF DESCRIPTION OF THE DRAWINGS

The accompanying drawings illustrate a preferred embodiment of the present disclosure, and together with the detailed disclosure, serve to provide a further understanding of the technical aspects of the present disclosure, and the present disclosure should not be construed as being limiting to the drawings. In the drawings, for clarity of description, the shape, size, scale or proportion of the elements may be exaggerated for emphasis.

DETAILED DESCRIPTION

Figure 1A:
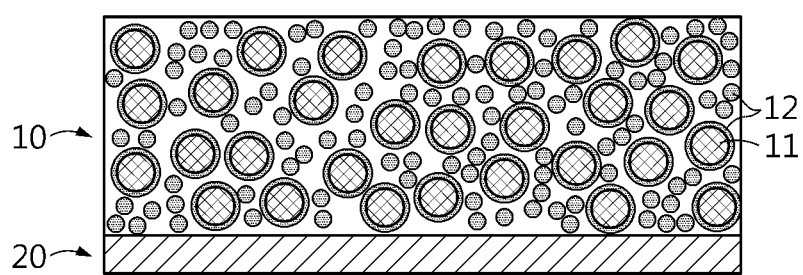
FIGS. 1a and 1b are schematic diagrams of a method for manufacturing an electrode for an all-solid-state battery according to the conventional art, showing a preliminary electrode and an electrode for an all-solid-state battery formed at high concentration of a first slurry and a second slurry.

Hereinafter, the embodiments of the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the context in the embodiments described herein is just a most preferred embodiment of the present disclosure, but not intended to fully describe the technical aspects of the present disclosure, so it should be understood that other equivalents and modifications could have been made thereto at the time the application was filed.

The term ⌜comprises⌟ when used in this specification, specifies the presence of stated elements, but does not preclude the presence or addition of one or more other elements, unless the context clearly indicates otherwise.

The terms ⌜about⌟ and ⌜substantially⌟ are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

The terms as used in the following detailed description are for the purpose of convenience, but not intended to being limiting. The terms 'right', 'left' 'top' and 'bottom' refer to the directions in the drawings to which reference is made. The terms 'inward' and 'outward' refer to the directions toward or away from the geometrical centers of the designated devices, systems and elements thereof. The terms 'front', 'rear', 'up', 'down' and related words and phrases refer to the locations and directions in the drawings to which reference is made and are not limiting. These terms include the above words and their derivatives and synonyms.

Unless the context clearly indicates otherwise, temperature is indicated in Celsius (° C.), and a mix ratio of each component is a weight ratio.

The present disclosure relates to a method for manufacturing an electrode for an all-solid-state battery. In addition, another embodiment of the present disclosure relates to a method for manufacturing an electrode assembly for an all-solid-state battery using the electrode manufactured by the manufacturing method of the present disclosure.

Figure 2A:
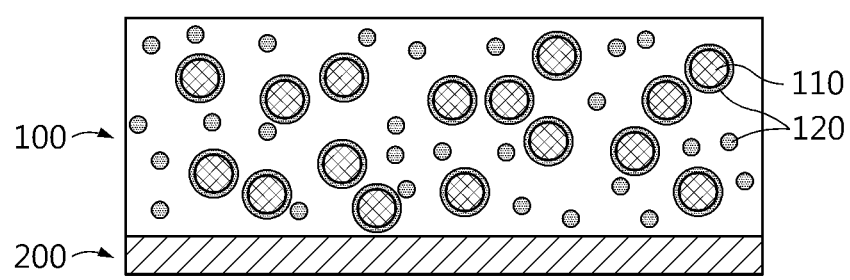
FIGS. 2a and 2b are schematic diagrams of a method for manufacturing an electrode for an all-solid-state battery according to an embodiment of the present disclosure, showing a preliminary electrode and an electrode for an all-solid-state battery formed using first and second slurries according to the present disclosure.
Figure 2B:
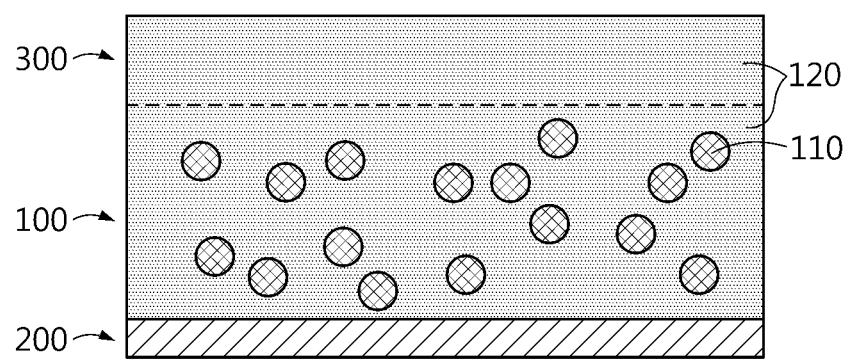

FIGS. 2a and 2b schematically shows a preliminary electrode and an electrode for an all-solid-state battery obtained according to an embodiment of the present disclosure. A method for manufacturing an electrode according to the present disclosure will be described in more detail with reference to FIGS. 2a and 2b.

First, a preliminary electrode is obtained by forming a preliminary electrode active material layer on the surface of a current collector. In this disclosure, an electrode having a preliminary electrode active material layer is referred to as preliminary electrode.

In the present disclosure, the current collector may be, for example, a metal plate that exhibits electrical conductivity, and current collectors that are well known in the field of secondary batteries may be appropriately used depending on the polarity of the electrode. For example, in the case of the negative electrode, a copper foil having a proper thickness may be used as the current collector, and in the case of the positive electrode, an aluminum foil may be used as the current collector.

Subsequently, a preliminary electrode active material layer-forming slurry (a first slurry) is coated on the surface of the current collector. The preliminary electrode active material layer-forming slurry is a liquid slurry comprising an electrode active material and a solid electrolyte, and may further comprise a binder resin and a conductive material appropriately where necessary.

In an embodiment of the present disclosure, the concentration of the remaining components (solids) except the solvent in the first slurry is 30 wt % to 60 wt %, and preferably 30 wt % to 55 wt %. When the concentration satisfies the above-described range, the first slurry may be uniformly coated on the current collector, and after drying, the preliminary electrode active material layer may exhibit appropriate porosity, and in the subsequent step, when coating a second slurry, the second slurry may go into the electrode active material layer well. In an embodiment of the present disclosure, the solvent preferably comprises at least one nonpolar solvent of 1,2-dichlorobenzene, pentane, benzene, xylene, toluene, chloroform, hexane, cyclohexane, carbon tetrachloride, ether, diethylamine, ioxane, chlorobenzene, anisole, tetrahydrofuran, methyl t-butyl ether or heptane.

Additionally, at least one type of electrode active material may be appropriately selected depending on the polarity of the electrode.

When the electrode is the positive electrode, the positive electrode active material may include, without limitation, any type of positive electrode active material of lithium ion secondary batteries. For example, the positive electrode active material may comprise layered compounds such as lithium cobalt oxide ($LiCoO_2$) and lithium nickel oxide ($LiNiO_2$) or compounds with one or more transition metal substitution; lithium manganese oxide of Formula $Li_{1+x}Mn_{2-x}O_4$ (x is 0 to 0.33), $LiMnO_3$, $LiMn_2O_3$, $LiMnO_2$; lithium copper oxide ($Li_2CuO_2$); vanadium oxide such as $LiV_3O_8$, $LiV_3O_4$, $V_2O_5$ and $Cu_2V_2O_7$; Ni-site type lithium nickel oxide represented by Formula $LiNi_{1-x}M_xO_2$(M=at least one selected from Co, Mn, Al, Cu, Fe, Mg, B or Ga, and x=0.01 to 0.3), for example, $LiNi_{0.8}Mn_{0.1}Co_{0.1}O_2$; lithium manganese composite oxide represented by Formula $LiMn_{1-x}M_xO_2$ (M=Co, Ni, Fe, Cr, Zn or Ta, x=0.01 to 0.1) or $Li_2Mn_3MO_8$(M=Fe, Co, Ni, Cu or Zn); lithium manganese composite oxide of spinel structure represented by $LiNi_xMn_{2-x}O_4$; $LiMn_2O_4$ with partial substitution of alkali earth metal ion for Li in Formula; disulfide compounds; $Fe_2(MoO_4)_3$. However, the positive electrode active material is not limited thereto.

On the contrary, when the electrode is the negative electrode, the negative electrode active material may comprise a carbon-based material. The carbon-based material may be at least one selected from the group consisting of graphite such as crystalline artificial graphite and/or crystalline natural graphite, amorphous hard carbon, low crystallinity soft carbon, carbon black, acetylene black, graphene and fibrous carbon. Preferably, the carbon-based material may comprise crystalline artificial graphite and/or crystalline natural graphite. Additionally, the negative electrode active material may comprise any type of negative electrode active materials that may be used in all-solid-state batteries. For example, the negative electrode active material may further comprise at least one selected from lithium metal; metal composite oxide such as $Li_xFe_2O_3$($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group I, Group II and Group III elements of the periodic table, halogen; $0 < x \leq 1$; $1 \leq y \leq 3$; $1 \leq z \leq 8$); lithium alloys; silicon-based alloys; tin-based alloys; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymer such as polyacetylene; Li—Co—Ni based materials; titanium oxide; lithium titanium oxide.

In an embodiment of the present disclosure, the electrode active material may be present in an amount of 30 wt % to 90 wt %, and preferably 40 wt % to 80 wt % based on 100 wt % of the finally obtained electrode active material layer.

The solid electrolyte preferably comprises a sulfide-based solid electrolyte. In an embodiment of the present disclosure, the solid electrolyte may comprise at least one of a polymer-based solid electrolyte or an oxide-based solid electrolyte in the necessary range.

In an embodiment of the present disclosure, in terms of ionic conductivity, the solid electrolyte may be present in an amount of 10 wt % to 70 wt %, and preferably 10 wt % to 50 wt % based on 100 wt % of the finally obtained electrode active material layer.

The sulfide-based solid electrolyte material comprises sulfur (S) and has ionic conductivity of metal belonging to Group I or Group II of the periodic table, and may comprise Li—P—S based glass or Li—P—S based glass ceramics. Non-limiting examples of the sulfide-based solid electrolyte may comprise at least one of $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$ or $Li_2S$—$GeS_2$—ZnS. However, the sulfide-based solid electrolyte is not particularly limited thereto.

The polymer-based solid electrolyte is a composite of a lithium salt and a polymer resin, i.e., a polymer electrolyte material formed by adding a polymer resin to a solvated lithium salt, and may exhibit ionic conductivity of about $1 \times 10^{-7}$ S/cm or above, and preferably about $1 \times 10^{-5}$ S/cm or above.

Non-limiting examples of the polymer resin may comprise at least one of polyether-based polymer, polycarbonate-based polymer, acrylate-based polymer, polysiloxane-based polymer, phosphazene-based polymer, polyethylene derivatives, alkylene oxide derivatives such as polyethylene oxide, phosphoric acid ester polymer, poly agitation lysine, polyester sulfide, polyvinyl alcohol, polyvinylidene fluoride or polymer including ionic dissociable groups. Additionally, in the polymer electrolyte, the polymer resin may comprise, for example, at least one selected from a group consisting of comb-like polymer resin, crosslinked polymer resin and branched copolymer obtained by copolymerization of a comonomer of amorphous polymer such as PMMA, polycarbonate, polysiloxane (pdms) and/or phosphazene into the main chain of polyethylene oxide (PEO).

In the electrolyte of the present disclosure, the lithium salt is an ionizable lithium salt and may be represented as $Li^+X^-$. The anion of the lithium salt is not particularly limited, and may comprise, for example, $F^-$, $Cl^-$, $BP^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, SCN, $(CF_3CF_2SO_2)_2N^-$.

The oxide-based solid electrolyte material contains oxygen (O) and has ionic conductivity of metal belonging to Group I or II of the periodic table. Non-limiting examples of the oxide-based solid electrolyte material may comprise at least one selected from LLTO-based compounds, $Li_6La_2CaTa_2O_{12}$, $Li_6La_2ANb_2O_{12}$ (A is Ca or Sr), $Li_2Nd_3TeSbO_{12}$, $Li_3BO_{2.5}N_{0.5}$, $Li_9SiAlO_8$, LAGP-based compounds such as $Li_{1.5}Al_{0.5}Ge_{1.5}(PO_4)_3$, LATP-based compounds, $Li_{1+x}Ti_{2-x}Al_xSi_y(PO_4)_{3-y}$ ($0 \leq x \leq 1$, $0 \leq y \leq 1$), $LiAl_xZr_{2-x}(PO_4)_3$ ($0 \leq x \leq 1$, $0 \leq y \leq 1$), $LiTi_xZr_{2-x}(PO_4)_3$ ($0 \leq x \leq 1$, $0 \leq y \leq 1$), LISICON-based compounds, LIPON-based compounds, perovskite-based compounds, NASICON-based compounds or LLZO-based compounds. However, the oxide-based solid electrolyte material is not particularly limited thereto.

The binder resin may comprise, without limitation, any type that is electrochemically stable. For example, the binder resin may comprise at least one of polyvinylidene fluoride-co-hexafluoro propylene, polyvinylidene fluoride-co-trichloroethylene, acrylate, polymethyl methacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, styrene-butadiene copolymer, isobutylene-isoprene copolymer such as butyl rubber, acrylonitrile-butadiene-rubber (NB R), butadiene rubber (BR), or ethylene propylene diene terpolymer (EPDM). In an embodiment of the present disclosure, in the preparation of the electrode active material layer-forming slurry, when considering the use of the sulfide-based solid electrolyte and the nonpolar solvent, the binder resin preferably comprises a nonpolar binder resin. The nonpolar binder resin may comprise at least one of acrylate, acrylonitrile-styrene-butadiene copolymer, styrene-butadiene copolymer, isobutylene-isoprene copolymer such as butyl rubber, acrylonitrile-butadiene-rubber (NBR) or ethylene propylene diene terpolymer (EPDM).

The binder resin may be generally included in the range of 1 wt % to 10 wt % based on 100 wt % of the electrode active material layer.

In the present disclosure, the conductive material is generally present in an amount of 1 wt % to 10 wt % based on the total weight of the mixture comprising the electrode active material. The conductive material is not limited to a particular type, and may comprise those having conductivity without causing a chemical change in the corresponding battery, for example, at least one selected from graphite such as natural graphite or artificial graphite; carbon black such as carbon black, acetylene black, ketjen black, channel black, furnace black, lamp black, and thermal black; conductive fibers including carbon fibers such as vapor-grown carbon fibers (VGCFs) or metal fibers; metal powder such as fluorocarbon, aluminum and nickel powder; conductive whiskers such as zinc oxide and potassium titanate; conductive metal oxide such as titanium oxide;

conductive materials such as polyphenylene derivatives.

In the present disclosure, each electrode active material layer may comprise at least one type of additive of an oxidation stabilizing agent, a reduction stabilizing agent, a flame retardant, a heat stabilizer or an antifogging agent where necessary.

When the first slurry is prepared as described above, the first slurry is coated on at least one surface of the current collector and dried to form a preliminary electrode active material layer. In this instance, the method for coating the first slurry is not limited to a particular type, and may comprise, for example, doctor blade coating, dip coating, gravure coating, slit die coating, spin coating, comma coating, bar coating, reverse roll coating, screen coating and cap coating methods.

Subsequently, the coated first slurry is dried to remove the solvent.

In the present disclosure, the porosity of the preliminary electrode active material layer obtained after drying is preferably about 50 vol % to 70 vol %. In the present disclosure, the porosity may be calculated from the true specific gravity of each component included in the obtained preliminary electrode active material layer and their loading amount (g/m$^2$) per area, and the thickness of the preliminary electrode active material layer. When the porosity is less than the above-described range, as described below, when coating the solid electrolyte layer, the solid electrolyte layer-forming slurry (the second slurry) does not sufficiently go into the preliminary electrode active material layer, which makes it impossible to form the electrode active material layer having a desired level of porosity. In contrast, when the porosity exceeds the above-described range, the bond strength between the electrode active material layer and the current collector may reduce. That is, when the porosity range is satisfied, the adhesive strength of the electrode active material layer and the current collector may be maintained at a desired range, and the second slurry may smoothly go into the preliminary electrode active material layer in the below-described step so that the electrode active material layer may be filled with the solid electrolyte.

In the present disclosure, the porosity of the preliminary electrode active material layer may be controlled by adjusting the concentration of the first slurry. FIG. 2a is a schematic diagram of the preliminary electrode obtained according to an embodiment of the present disclosure, showing the preliminary electrode active material layer 100 formed on the surface of the current collector 200. The preliminary electrode active material layer comprises a solid electrolyte material 120 and an electrode active material 110, and at least part of the surface of the electrode active material may be coated with the solid electrolyte material. As shown in FIG. 2a, the preliminary electrode active material layer having the porosity of about 50 vol % to 70 vol % may be obtained by controlling the concentration of solids in the first slurry in the above-described range. FIG. 1a is a schematic diagram of the preliminary electrode formed at high concentration of the first slurry as in comparative example, showing the preliminary electrode active material layer 10 formed on the surface of the current collector 20. The preliminary electrode active material layer comprises a solid electrolyte material 12 and an electrode active material 11, and at least part of the surface of the electrode active material may be coated with the solid electrolyte material. As shown in FIG. 1a, the concentration of solids in the first slurry is high, and as a result, the porosity is lower than that of the preliminary electrode active material layer obtained in the present disclosure.

Subsequently, a solid electrolyte layer-forming slurry (a second slurry) is coated on the preliminary electrode active material layer and dried to form an electrode active material layer and a solid electrolyte layer on the surface of the electrode active material layer. The second slurry is a liquid slurry comprising a solid electrolyte. In an embodiment of the present disclosure, the slurry may further comprise a binder resin in a proper range where necessary. For example, the binder resin may be included in the range of 1 part by weight to 20 parts by weight based on 100 parts by weight of the solid electrolyte.

In an embodiment of the present disclosure, the concentration of the remaining components (solids) except the solvent in the second slurry is 30 wt % to 50 wt %, and preferably 30 wt % to 40 wt %. When the concentration satisfies the above-described range, the second slurry in optimum amounts may go into the preliminary electrode active material layer to fill the pores of the preliminary electrode active material layer and form a solid electrolyte layer of a predetermined thickness on the surface of the electrode active material layer. Additionally, the formation of the solid electrolyte layer having the predetermined thickness may provide sufficient bond between the corresponding electrode and the counter electrode. In the present disclosure, regarding the components (the solid electrolyte, the binder resin, etc.) included in the second slurry, a reference may be made to the description of the preliminary electrode active material layer-forming slurry. For example, at least one of the above-described components may be appropriately selected and used to prepare the second slurry.

As described above, when the second slurry is prepared, the second slurry is coated on the surface of the preliminary electrode active material layer obtained in the above-described step and dried to form an electrode active material layer and a solid electrolyte layer on the surface of the electrode active material layer. In this instance, the method for coating the slurry is not limited to a particular type, and may comprise, for example, doctor blade coating, dip coating, gravure coating, slit die coating, spin coating, comma coating, bar coating, reverse roll coating, screen coating and cap coating methods. Subsequently, the coated solid electrolyte layer-forming slurry is dried to remove the solvent.

As described above, when the second slurry is coated on the surface of the preliminary electrode active material layer having high porosity, the second slurry goes into the preliminary electrode active material layer through the pores of the preliminary electrode active material layer, and fills the pores of the electrode active material. The resultant electrode active material layer may have a low level of porosity, for example, preferably porosity of 10 vol % to 30 vol % or 20 vol % to 30 vol %.

FIG. 2b is a diagram of an electrode for an all-solid-state battery manufactured according to an embodiment of the present disclosure, schematically showing the solid electrolyte layer 300 formed on the electrode active material layer 100. Referring to FIG. 2b, when the second slurry is coated, the second slurry goes into the preliminary electrode active material layer having high porosity, and the pores of the preliminary electrode active material layer are filled with the solid electrolyte material, thereby obtaining the electrode having low porosity.

Figure 1B:
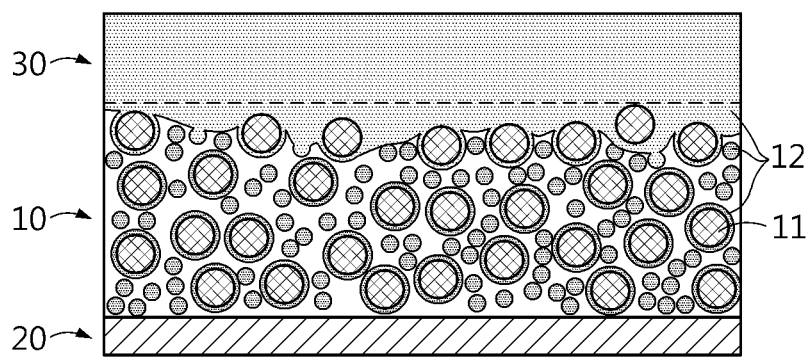

FIG. 1b is a diagram of an electrode for an all-solid-state battery manufactured according to comparative example, schematically showing the solid electrolyte layer 30 formed on the electrode active material layer 10. Referring to FIG. 1b, when coating the second slurry, low porosity of the preliminary electrode active material layer hinders the second slurry from going into the preliminary electrode active material layer, which makes it difficult to fill the pores of the preliminary electrode active material layer with the solid electrolyte material. Accordingly, it is difficult to manufacture the electrode having low porosity.

As described above, the present disclosure may obtain the electrode for an all-solid-state battery with low porosity by adjusting the concentration of the slurry. The all-solid-state battery using a solid electrolyte material, not a liquid electrolyte material, and thus it needs to have a close contact between the constituent materials of the battery such as the electrode active material and the solid electrolyte material. Accordingly, when the manufacturing method according to the present disclosure is applied, the electrode active material layer is filled with the solid electrolyte material, bringing the components into close contact, thereby improving the interfacial resistance characteristics.

After the electrode is obtained, before the electrode assembly is manufactured, where necessary, a pressing process (first pressing process) may be additionally performed on the electrode. However, as the obtained electrode exhibits low porosity as described above, the pressing may be performed in a very mild condition.

The electrode having the solid electrolyte layer may be prepared by the above-described method. The electrode according to the present disclosure comprises an electrode active material layer and a solid electrolyte layer formed on the surface of the electrode active material layer. The solid electrode active material layer has a mixed phase of the solid electrolyte and the electrode active material, and the mixed phase comprises ones derived from the first slurry and ones introduced by the second slurry. When manufacturing the electrode for an all-solid-state battery, the electrode having appropriate porosity necessary for solid electrolyte batteries may be obtained by appropriately controlling the concentration of the first and second slurries without applying too much pressure. The electrode may further comprise the current collector.

Further, the present disclosure provides an electrode assembly for an all-solid-state battery. The electrode assembly for an all-solid-state battery may include a positive electrode, a negative electrode and a solid electrolyte membrane interposed between the positive electrode and the negative electrode. In this instance, at least one of the negative electrode or the positive electrode may be an electrode obtained by the manufacturing method according to the present disclosure. In an embodiment of the present disclosure, the electrode assembly may be manufactured by stacking the positive electrode and the negative electrode, and if necessary, applying the pressure to join the positive electrode and the negative electrode. In this case, as the surface of at least one electrode has the solid electrolyte layer, and the solid electrolyte layer may act as the solid electrolyte membrane. Alternatively, the electrode assembly may be manufactured by forming a separate solid electrolyte membrane, placing it between the positive electrode and the negative electrode, and if necessary, applying the pressure to join the negative electrode, the positive electrode and the solid electrolyte membrane. In an embodiment of the present disclosure, it is possible to further adjust the porosity of the electrode to a desired level by a pressing process (a second pressing process) additionally performed when manufacturing the electrode assembly. The solid electrolyte membrane may comprise, without limitation, any ion conducting layer comprising a solid electrolyte material that may be commonly used in the technical field of all-solid-state batteries. For example, in the solid electrolyte membrane, the solid electrolyte material may comprise at least one of a polymer-based solid electrolyte material, an oxide-based solid electrolyte material or a sulfide-based solid electrolyte material.

In a particular embodiment of the present disclosure, either the first pressing process or the second pressing process or both may be performed, and the pressing processes may be appropriately performed so that the electrode included in the all-solid-state battery may finally have the porosity of less than about 10 vol %. For example, both the first and second pressing processes may be performed in that order so that the electrode may finally have the porosity of less than 10 vol %, or only the second pressing process may be performed without performing the first pressing process so that the electrode may finally have the porosity of less than 10 vol %. However, as the obtained electrode has low porosity as described above, the pressing may be performed on a very mild condition.

In still another embodiment, when both the positive electrode and the negative electrode are electrodes manufactured by the manufacturing method of the present disclosure, both the positive electrode and the negative electrode have the solid electrolyte layer on the surface of the electrode active material layer, and the two electrodes may be stacked such that the solid electrolyte layers of the two electrodes face each other and laminated to obtain an electrode assembly for an all-solid-state battery comprising positive electrode/solid electrolyte membrane/negative electrode. That is, the solid electrolyte layers of the two electrodes may be combined to form the solid electrolyte membrane.

Further, the present disclosure provides a battery module comprising the above-described electrode assembly, a battery pack comprising the battery module, and a device comprising the battery pack as a power source. In this instance, a specific example of the device may include, but is not limited to, power tools; electric vehicles including Electric Vehicles (EVs), Hybrid Electric Vehicles (HEVs), Plug-in Hybrid Electric Vehicles (PHEVs); electric two wheelers including E-bikes and E-scooters; electric golf carts; and power storage systems, operated by power from an electric motor.

Hereinafter, the present disclosure is described in more detail through examples, but the following examples are provided to describe the present disclosure by way of illustration, and the scope of the present disclosure is not limited thereto.

Preparation Example (1) Preparation of Electrode Assembly

An aluminum thin film (17 μm thick) is prepared as a positive electrode current collector, and a copper thin film (17 μm thick) is prepared as a negative electrode current collector.

A positive electrode active material, a solid electrolyte, a binder and a conductive material are added to xylene as shown in the following [Table 1] and mixed together using a paste mixer to prepare a first slurry for positive electrode. The mixing is performed at 1500 rpm for 15 min in the room temperature condition. Each component is summarized in the following [Table 1]. The concentration of solids in each first slurry is as shown in the following [Table 2].

Additionally, a negative electrode active material, a solid electrolyte, a binder and a conductive material are added to xylene as shown in the following [Table 1] and mixed together using a paste mixer to prepare a first slurry for negative electrode. The mixing is performed at 1500 rpm for 15 min in the room temperature condition. Each component is summarized in the following [Table 1]. The concentration of solids in each second slurry is as shown in the following [Table 2].

Subsequently, each first slurry is coated on the current collector using doctor blade and vacuum-dried for 2 hours in the room temperature to form a preliminary electrode active material layer. The porosity of each preliminary electrode active material layer is as shown in the following [Table 2].

Subsequently, a LPS solid electrolyte and a binder (BR and NBR) are added to xylene and mixed together. A weight ratio of the solid electrolyte and the binder is 95:5. The solid electrolyte and the binder are mixed using a paste mixer to prepare a second slurry. The prepared second slurry is coated on the preliminary electrode active material layer using doctor blade at the coating rate of 5 m/min and vacuum-dried at room temperature for 12 hours. The porosity of each preliminary electrode active material layer is as shown in the following [Table 2].

Each of the positive electrode and the negative electrode obtained as described above is used and stacked with the opposite polarity along with lithium metal (40 μm thick), and the pressure of 400 Mpa is applied at room temperature for 1 min to manufacture a battery.

The material and characteristics used in each example and comparative example are shown in the following [Table 1].

TABLE 1

| | | Preliminary electrode active material layer | | | |
|---|---|---|---|---|---|
| | Electrode active material | Solid electrolyte | Binder resin | Conductive material | Ratio (electrode active material: solid electrolyte: binder resin: conductive material) (on the basis of weight ratio) |
| Example 1 | $LiNi_{0.6}Co_{0.2}Mn_{0.2}O_2$ | LPS | NBR | VGCF | 77:16:3:4 |
| Example 2 | Graphite | LPS | NBR | VGCF | 63:32:2:3 |
| Comparative example 1 | $LiNi_{0.6}Co_{0.2}Mn_{0.2}O_2$ | LPS | NBR | VGCF | 73:25:0.5:1.5 |
| Comparative example 2 | Graphite | LPS | NBR | VGCF | 54.9:43.1:0.5:1.5 |

TABLE 2

| | Concentration of first slurry (wt %) | Porosity of preliminary electrode active material layer (vol %) | Concentration of second slurry (wt %) | Porosity of electrode active material layer (vol %) | Thickness of electrode active material layer (μm) | Thickness of solid electrolyte layer (μm) |
|---|---|---|---|---|---|---|
| Example 1 | 45 | 60 | 40 | 29.3 | 155 | 150 |
| Example 2 | 40 | 57.7 | 40 | 26.3 | 165 | 150 |
| Comparative example 1 | 65 | 40 | 60 | 40 | 144 | 200 |
| Comparative example 2 | 60 | 36 | 60 | 36 | 130 | 200 |

TABLE 3

|  | Design capacity (mAh) | Actual capacity (mAh) | Capacity efficiency (%) (actual capacity/design capacity) × 100 | 0.1 C./ 0.05 C. (%) |
|---|---|---|---|---|
| Example 1 | 2.57 | 2.52 | 98 | 99.5 |
| Example 2 | 2.99 | 2.87 | 98 | 99.5 |
| Comparative example 1 | 2.57 | 2.31 | 90 | 98.2 |
| Comparative example 2 | 2.7 | 2.40 | 89 | 98.6 |

1) Capacity Efficiency Measurement Method

The batteries manufactured in example 1 and comparative example 1 are charged and discharged for a cycle with the constant current of 0.05 C at 25° C. in the voltage range of 3V to 4.25V vs lithium metal, and the battery capacity is observed (actual capacity) and compared with the design capacity. Additionally, the batteries manufactured in example 2 and comparative example 2 are charged and discharged for a cycle with the constant current of 0.05 C at 25° C. in the voltage range of 0.005V to 1.5V vs lithium metal, and the battery capacity is observed and compared with the design capacity.

2) High Rated Discharge Characteristics Evaluation Method

The batteries of example 1 and comparative example 1 are charged and discharged for a cycle with the constant current of 0.05 C at 25° C. in the voltage range of 3V to 4.25V vs lithium metal, and the battery capacity is observed ($1^{st}$ cycle). Subsequently, the batteries are charged and discharged for another cycle with 0.1 C constant current in the voltage range of 3V to 4.25V, and the battery capacity is observed ($2^{nd}$ cycle). On the other hand, the batteries of example 2 and comparative example 2 are charged and discharged for a cycle with the constant current of 0.05 C at 25° C. in the voltage range 0.005V to 1.5V vs lithium metal, and the battery capacity is observed ($1^{st}$ cycle). Subsequently, the batteries are charged and discharged for another cycle with 0.1 C constant current in the voltage range of 0.005V to 1.5V, and the battery capacity is observed ($2^{nd}$ cycle). In each example and comparative example, and the battery capacity ratio of $1^{st}$ cycle/$2^{nd}$ cycle is observed and shown in the above [Table 3].

3) Evaluation

As can be seen from the above [Table 3], the actual capacity of the batteries according to examples 1 and 2 is found closer to the design capacity than the batteries of comparative examples. It can be also seen that the batteries according to examples 1 and 2 have better high-rated discharge characteristics than the batteries of comparative examples.

What is claimed is:

1. A method for manufacturing an electrode for an all-solid-state battery, comprising:
    (S1) a first step of preparing a preliminary electrode active material layer-forming slurry comprising an electrode active material and a first solid electrolyte, wherein a concentration of solids except a first solvent in the preliminary electrode active material layer-forming slurry is 30 wt % to 60 wt %;
    (S2) a second step of coating the preliminary electrode active material layer-forming slurry on a surface of a current collector and drying the preliminary electrode active material layer-forming slurry to form a preliminary electrode active material layer;
    (S3) a third step of preparing a solid electrolyte layer-forming slurry comprising a second solid electrolyte, wherein a concentration of solids except a solvent in the solid electrolyte layer-forming slurry is 30 wt % to 50 wt %; and
    (S4) a fourth step of coating the solid electrolyte layer-forming slurry on a surface of the preliminary electrode active material layer and drying the solid electrolyte layer-forming slurry to obtain an electrode,
    wherein the preliminary electrode active material layer obtained in the second step has porosity of 50 vol % to 70 vol %, and
    wherein the electrode obtained in the fourth step comprises an electrode active material layer, and a solid electrolyte layer formed on a surface of the electrode active material layer, and the electrode active material layer has porosity of 20 vol % to 30 vol %.

2. The method for manufacturing an electrode for an all-solid-state battery according to claim 1, wherein the solid electrolyte in the preliminary electrode active material layer-forming slurry and the second solid electrolyte in the solid electrolyte layer-forming slurry comprises a sulfide-based solid electrolyte.

3. The method for manufacturing an electrode for an all-solid-state battery according to claim 2, wherein the sulfide-based solid electrolyte contains sulfur (S) and comprises at least one of Li-P-S(LPS) based glass or Li-P-S (LPS) based glass ceramics.

4. The method for manufacturing an electrode for an all-solid-state battery according to claim 1, wherein the first solvent in the preliminary electrode active material layer-forming slurry and the second solvent the solid electrolyte layer-forming slurry comprises a nonpolar solvent.

5. The method for manufacturing an electrode for an all-solid-state battery according to claim 4, wherein the nonpolar solvent comprises at least one of 1,2-dichlorobenzene, pentane, benzene, xylene, toluene, chloroform, hexane, cyclohexane, carbon tetrachloride, ether, diethylamine, ioxane, chlorobenzene, anisole, tetrahydrofuran, methyl t-butyl ether or heptane.

6. The method for manufacturing an electrode for an all-solid-state battery according to claim 1, wherein the preliminary electrode active material layer-forming slurry and/or the solid electrolyte layer-forming slurry comprises a binder resin, and
    the binder resin comprises at least one of acrylate, acrylonitrile-styrene-butadiene copolymer, styrene-butadiene copolymer, isobutylene-isoprene copolymer including butyl rubber, acrylonitrile-butadiene-rubber (NBR) or ethylene propylene diene terpolymer (EPDM).

7. A method for manufacturing an all-solid-state battery, comprising:
    stacking a positive electrode and a negative electrode and applying pressure,
    wherein at least one of the negative electrode or the positive electrode is manufactured by the method according to claim 1, and the positive electrode and the negative electrode are stacked with the solid electrolyte layer interposed between.

8. The method for manufacturing an electrode for an all-solid-state battery according to claim 1, wherein the electrode active material is present in an amount of 30 wt % to 90 wt %, based on 100 wt % of the electrode active material layer.

9. The method for manufacturing an electrode for an all-solid-state battery according to claim 1, wherein a combination of the first solid electrolyte and the second solid electrolyte is present in an amount of 10 wt % to 70 wt %, based on 100 wt % of the electrode active material layer.

10. The method for manufacturing an electrode for an all-solid-state battery according to claim 3, wherein the sulfide-based solid electrolyte comprises at least one of $Li_2S-P_2S_5$, $Li_2S-LiI-P_2S_5$, $Li_2S-LiI-Li_2O-P_2S_5$, $Li_2S-LiBr-P_2S_5$, $Li_2S-Li_2O-P_2S_5$, $Li_2S-Li_3PO_4-P_2S_5$, $Li_2S-P_2S_5-P_2O_5$, $Li_2S-P_2S_5-SiS_2$, $Li_2S-P_2S_5-SnS$, $Li_2S-P_2S_5-Al_2S_3$, $Li_2S-GeS_2$ or $Li_2S-GeS_2-ZnS$.

* * * * *